(12) United States Patent
Goldbach et al.

(10) Patent No.: US 10,137,609 B2
(45) Date of Patent: Nov. 27, 2018

(54) METHOD AND DEVICE FOR THE THERMAL TREATMENT OF FRICTION LININGS

(71) Applicant: TMD Friction Services GmbH, Leverkusen (DE)

(72) Inventors: Kai Goldbach, Muhlheim an der Ruhr (DE); Thomas Hueber, Essen (DE); Richard Lewis, Metmann (DE); Paulo Perin, Leverkusen (DE)

(73) Assignee: TMD Friction Services GmbH, Leverkusen (DE)

( * ) Notice: Subject to any disclaimer, the term of this patent is extended or adjusted under 35 U.S.C. 154(b) by 4 days.

(21) Appl. No.: 15/032,416

(22) PCT Filed: Apr. 14, 2015

(86) PCT No.: PCT/EP2015/058020
§ 371 (c)(1),
(2) Date: Apr. 27, 2016

(87) PCT Pub. No.: WO2015/158686
PCT Pub. Date: Oct. 22, 2015

(65) Prior Publication Data
US 2017/0182683 A1    Jun. 29, 2017

(30) Foreign Application Priority Data
Apr. 17, 2014 (DE) ........................ 10 2014 105 484

(51) Int. Cl.
| | |
|---|---|
| *B29C 35/08* | (2006.01) |
| *F16D 69/02* | (2006.01) |
| *B29C 71/02* | (2006.01) |
| *B29C 71/04* | (2006.01) |
| *B29L 31/16* | (2006.01) |
| *B29L 31/00* | (2006.01) |
| *B29L 31/30* | (2006.01) |

(52) U.S. Cl.
CPC .......... *B29C 35/0805* (2013.01); *B29C 71/02* (2013.01); *B29C 71/04* (2013.01); *F16D 69/02* (2013.01); *B29C 2035/0822* (2013.01); *B29L 2031/16* (2013.01); *B29L 2031/30* (2013.01); *B29L 2031/7482* (2013.01); *F16D 2250/00* (2013.01); *F16D 2250/0038* (2013.01)

(58) Field of Classification Search
CPC ......... B29C 2035/0822; B29C 35/0805; B29L 2031/16; B29L 2031/30; F16D 2250/00; F16D 2250/0038; F16D 69/02
USPC ........................................ 392/411
See application file for complete search history.

(56) References Cited

U.S. PATENT DOCUMENTS

| | | | |
|---|---|---|---|
| 3,236,160 A | 2/1966 | Mullaney | |
| 4,994,214 A * | 2/1991 | Stevens | B29C 47/0021 264/134 |
| 2002/0046789 A1* | 4/2002 | Grimme | B29C 71/02 148/565 |
| 2010/0086669 A1* | 4/2010 | Kuhlenschmidt | B05D 3/0263 427/8 |

FOREIGN PATENT DOCUMENTS

| | | |
|---|---|---|
| DE | 3318487 A1 | 11/1983 |
| DE | 3336244 A1 | 4/1985 |
| DE | 19642288 A1 | 4/1998 |
| DE | 10063256 A1 | 6/2002 |
| DE | 102005029036 A1 | 12/2006 |
| DE | 102009011910 A1 | 9/2009 |
| EP | 0355876 A1 | 2/1990 |
| EP | 420632 A2 | 4/1991 |
| EP | 799391 A1 | 10/1997 |
| EP | 1085231 A1 | 3/2001 |
| KR | 100645914 B1 | 11/2006 |
| WO | 97/10936 A2 | 3/1997 |
| WO | 2014147807 A1 | 9/2014 |

OTHER PUBLICATIONS

Office Action dated Jan. 31, 2017 in DE Application No. 10 2014 105 484.9.
Int'l Search Report dated Oct. 14, 2015 in Int'l Application No. PCT/EP2015/058020.
Translation of Office Action dated Dec. 20, 2016 from JP2016-252705.
Infrared radiation, Japan, Ushio Denki Kabushiki Kaisha, Oct. 6, 2010.
Infrared heating, Japan, Iwasaki Electric Co. Ltd., Jan. 19, 2007.
Opposition against EP 3007886B1, filed Sep. 6, 2017 in the European Patent Office by NV Bekaert SA.
N. Even, "Gem9E", Revue ATIP, vol. 66, No. 4, Nov. 2012.
R. Dante, "Production Processes for Organic Brake Pads", Chapter 4, Handbook of Friction Materials and Their Applications, Elsevier Ltd., 2016.
J. Shuttleworth, "Gas Infrared Systems", Automotive Engineering, SAE International, internet publication dated Feb. 11, 2014, downloaded Sep. 2, 2017.
Davron Technologies, Inc., "Davron Manufactures Space-Saving IR Continuous Scorch Machine", internet publication dated Feb. 11, 2014, downloaded Aug. 24, 2017 from http://www.prweb.com/releases/2014/02/prweb11572944.htm.
Solaronics S.A., "Gas Infrared GemScorcher", product advertisement, Mar. 2014.
Solaronics S.A. e-mails sent Mar. 26, 2014 to share "Gas Infrared GemScorcher" product advertisement.
Declaration of Nicolas Even, dated Aug. 31, 2017, accompanying Opposition against EP 3007886B1, filed Sep. 6, 2017 in the European Patent Office by NV Bekaert SA.

\* cited by examiner

*Primary Examiner* — Dana Ross
*Assistant Examiner* — James Sims, III
(74) *Attorney, Agent, or Firm* — Rogowski Law LLC

(57) ABSTRACT

The invention relates to a device and a method for the thermal treatment of friction linings by means of IR-radiation, characterized in that IR radiators or IR heating fields are used as a source of infrared radiation, said radiators or heating fields generating IR-radiation in the wavelength range of 2260 nm to 3000 nm.

6 Claims, No Drawings

METHOD AND DEVICE FOR THE THERMAL TREATMENT OF FRICTION LININGS

CROSS-REFERENCE TO RELATED APPLICATIONS

This application is a national stage application (under 35 USC § 371) of PCT/EP2015/058020, filed Apr. 14, 2015, which claims benefit of German application No. 10 2014 105 484.9, filed Apr. 17, 2014, the contents of each of which are incorporated by reference herein.

BACKGROUND OF THE INVENTION

Technical Field and State of the Art

The present invention relates to a method and to a corresponding device for the thermal treatment and thus also for the hardening of friction linings.

A method and a device of the above-mentioned type are known, for example, from European patent EP 1 085 231 B1 and from German patent 100 63 256 C2 as well as from the state of the art cited there. However, these only serve for the treatment of the surfaces of friction linings of the kind used especially for brakes and brake linings of motor vehicles.

Such friction linings and thus also the friction lining surfaces generally contain organic binders. Friction linings are preferably made of a mixture of organic and inorganic substances that are compressed at high pressures and at high temperatures. Friction linings for brakes and clutches are made, for example, of plastics that consist of a high-strength substrate (e.g. aramid fibers), one or more binders (usually synthetic resins) and various organic as well as inorganic fillers in order to set the desired friction value. Friction linings that are produced using sintered materials are often used for disc brakes and block brakes.

In order to prevent so-called green fade of the brakes with the accompanying heat generation when the brakes are being used for the first time—a phenomenon that is primarily due to the organic binders that are contained in the friction lining surfaces—the friction lining surfaces undergo a thermal treatment, a so-called "scorching" process, before the brake linings are installed. This treatment serves to increase the porosity of the lining surface by means of so-called carbonization of the organic materials contained in the friction linings and in their surfaces.

A known scorching technique consists of treating the friction lining surfaces with a gas flame. Here, however, the temperature on the surface is highly dependent on the gas flame, especially on the type of combustion gas used, and on the oxygen feed during the treatment. An excessively hot flame can cause the inorganic constituents or the metals on the friction lining surface to melt, whereas a cold flame can lead to excessively long treatment times and carbon fouling of the friction lining surface.

According to European patent EP 0 799 391 B1, the above-mentioned problems encountered during scorching can be prevented by placing a hot plate onto the lining surface. This method calls for high capital expenditures and the problem of uneven heating of the surface is not satisfactorily solved. Moreover, the gases formed when the hot plate is pressed onto the lining surface cannot be adequately removed from there.

In order to avoid the above-mentioned disadvantages during the treatment of friction lining surfaces, European patent EP 1 085 231 B1 proposes a modified method for this purpose. Here, the friction lining surface is brought up to an elevated temperature for a limited period of time by means of the following measures:
  a) the friction lining surface is treated with IR radiation in an inert, oxidizing or reducing atmosphere
  b) at a wavelength of 780 nm to 1400 nm (with a maximum intensity at 1200 nm) and a power density of 150 kW/m$^2$ to 800 kW/m$^2$.

As a result, the lining surface is heated to a temperature of 700° C. to 900° C. [1292° F. to 1652° F.] for a period of time of 5 to 40 seconds.

Moreover, in this European patent publication, a device for carrying out the above-mentioned method is described which consists of an IR furnace or an IR tunnel. This device has, among other things, an exhaust unit in the treatment chamber (furnace chamber) for removing the gases formed during the scorching. The friction linings are continuously conveyed through the furnace chamber by means of a transport system, preferably a conveyor belt. In the furnace chamber, there is an IR module for generating the IR radiation needed for the thermal surface treatment. This module typically consists of 5 to 40 individual IR radiators that can be switched on and off at time intervals of about 5 seconds so as to be gentle on the installation and to save energy.

German patent DE 100 63 256 C2 also proposes an improved method for the thermal treatment of friction linings in order to increase their surface porosity by means of carbonization and thus to improve their material properties or their braking action.

In a manner very similar to the above-mentioned method in European patent EP 1 085 231 B1, according to the German publication, the lining surface is treated with IR radiation. This radiation has a wavelength of 800 nm to 1500 nm and a power density (on the lining surface) of 300 kW/m$^2$ to 700 kW/m$^2$. In this manner, surface temperatures of 550° C. to 850° C. [1022° F. to 1562° F.] are generated during a treatment time of 2 to 5 seconds. The device employed here corresponds largely to the IR furnace or IR tunnel of the type known from the cited European patent. Here, one or more halogen lamps are used in the treatment chamber in order to generate the IR radiation.

Thus, the methods known from the state of the art for the thermal treatment of friction lining surfaces by means of IR radiation, characterized in that IR radiation have in common the fact that this treatment by means of short-wave infrared radiation takes place at a very high power density on the lining surface. Advantages of the short-wave infrared radiation especially include the fact that
  a) this type of radiation transports the thermal energy very efficiently without using a medium, as a result of which the surface treatment can also be carried out within the scope of a negative pressure process and the degradation products that are formed during the scorching and that stem from the organic constituents of the brake lining mixture can be removed using strong exhaust units, and
  b) the radiators used to generate the infrared radiation have a very short response time of 1 to 3 seconds, so that the installation does not have to run constantly in order to reach the requisite temperatures.

The methods described above, however, have drawbacks, especially in terms of the mass production of brake linings, and therefore they are in need of improvement with an eye towards attaining an easy-to-handle and robust production process with a consistently high product quality as well as with an eye towards cost effectiveness and energy efficiency.

Thus, for example, owing to the high power density of the IR radiators, the short treatment times, and the (briefly) occurring high surface temperatures, corresponding temperature differences can occur on the friction lining surfaces, leading to inhomogeneities of the material properties of the friction linings that have been treated in this way. Moreover, the described devices have to be switched on and off more frequently so as not to stress the installation and in order to save energy. Finally, the methods described in the state of the art only bring about carbonization of the friction lining surfaces, whereas a further-reaching hardening of the (entire) friction lining, whose composition does not differ from that of the surface, is not carried out.

Before this backdrop, one objective of the present invention was to put forward a method and a device or arrangement suited for this purpose in order to thermally treat (also to increase the porosity of or to harden) friction linings in a manner that avoids the disadvantages known from the state of the art or that further improves the prior-art methods and devices. Moreover, the thermal treatment of the friction linings should go beyond a carbonization of only the friction lining surface.

SUMMARY OF THE INVENTION

This objective is especially achieved by a method and by a device or arrangement of device elements with which a so-called infrared radiator (IR radiator) is used as the source of infrared radiation. This source of radiation is preferably used in an IR furnace or in an IR tunnel in which, once again preferably, special process parameters prevail.

DETAILED DESCRIPTION

The infrared radiator according to one embodiment of the invention is an electric resistance heat conductor that is preferably placed onto a suitable ceramic material or that is mounted onto this material. This protects the heat conductor from overheating and translates into a longer service life, especially also when the device is used continuously. This is preferred according to the invention and avoids a repeated switching on and off of the source of infrared radiation. As a result, an optimally uniform treatment temperature for the friction linings is made available inside the device according to the invention (the IR furnace or the IR tunnel according to the invention).

The material that is used to attach the heat conductor is electrically non-conductive and should have good emission properties in the desired IR wavelength range. Taking these criteria into account, IR radiators with many different geometries are available. Thus, according to the invention, the furnace chamber or treatment chamber can be optimally lined, thereby ensuring an optimal temperature management and temperature constancy in the furnace chamber. Ceramic materials in combination with the electric heat conductor have proven their worth for purposes of the invention. Here, it is preferable to use ceramic substrates or ceramic tiles in combination with metal strips or metal wires.

Such IR furnaces or IR tunnels that are equipped with ceramic radiators or heating fields or else corresponding furnace concepts including exhaust units for gases that are formed during the treatment and including a suitable conveying means to transport the material to be treated through the furnace chamber are all commercially available.

As a rule, the IR radiators or heating fields according to one embodiment of the invention emit IR radiation in the wavelength range preferably from 2260 nm to 3000 nm, with a surface power of preferably 10 kW/m$^2$ to 80 kW/m$^2$, whereby the especially preferred value here is 20 kW/m$^2$ to 40 kW/m$^2$. According to this embodiment of the invention, these values result in treatment times for the thermal treatment or for the hardening of the friction linings of 300 to 2400 seconds, preferably from 600 to 1200 seconds, in the case of the friction lining mixtures commonly used for motor vehicle brake linings, especially disc brake linings. Here, a surface temperature of 300° C. to 500° C. [572° F. to 932° F.], preferably 350° C. to 450° C. [662° F. to 842° F.], is generated on the friction lining.

In addition to the above-mentioned electric resistance infrared radiators, it is also possible to use, for example, gas-heated ceramic heating fields (such as ceramic pore radiators) as the IR radiators. According to an embodiment of the invention, the essential and preferable aspect is the adherence to the above-mentioned process parameters, rather than the type of IR radiator used to attain these parameters.

Consequently, the use according to an embodiment of the invention of IR furnaces/devices with sources of infrared radiation (gas-heated ceramic heating fields or electric IR radiators) especially yields the following advantages: there is no need for additional cooling of the IR radiators/heating fields, the furnace chamber can be have a simple design, the temperature management, coupled with appropriately reproducible product quality, is optimal, and the energy savings due to lower treatment temperatures are considerable. Moreover, by varying the treatment time and the IR intensity/temperature (radiator distance), it is possible to set any desired hardness profile (ranging from surface hardening all the way to a hardening of the entire friction lining compound) for the friction lining and thus also their mechanical properties simply by performing routine experiments.

The further configuration of the device according to an embodiment of the invention for the thermal treatment of friction linings can be very easily adapted to the individual requirements of the operation in question and can comprise equipment of the type found in commercially available products and in the state of the art, for example, according to European patent EP 1 085 231 B1 or German patent DE 100 63 256 C2. These include, for example: an exhaust unit, preferably in the furnace chamber or treatment chamber, to remove the gaseous substances formed by the thermal treatment, a cooling device to cool the friction linings after the thermal treatment, a transport means such as, for example, a conveyor belt to transport the friction linings/friction lining surfaces through the furnace chamber/treatment chamber, process monitoring sensors, especially temperature sensors for the friction lining surfaces. Thus, for example, adjoining the furnace chamber/treatment chamber, there can be a temperature sensor that is connected to the control unit for the source of infrared radiation and that can monitor and control the adherence to the desired product surface temperature of the friction linings. By means of this temperature detection, it is also possible to directly segregate defective friction linings from the production process. Sensors for detecting objects before and after they enter the treatment chamber can be used for the further control of the method/device according to the invention.

The device according to embodiments of the invention and the corresponding method thus correspond largely to the devices and methods according to European patent EP 1 085 231 B1 [US 2002/046789 A1] and/or German patent DE 100 63 256 C2 [WO 0250448], and they differ from them especially through the use of an IR furnace/IR tunnel that is equipped with the described sources of infrared radiation, as well as through the use of the process parameters that prevail there. The disclosure of these two documents is thus hereby explicitly incorporated as an integral part of the present description.

Below, properties and advantages of the method according to an embodiment of the invention are described by way of example. This serves to illustrate the present invention, without thereby limiting it in any way whatsoever. Any technically meaningful combination of parameters and/or of equipment found by the person skilled in the art is encompassed by the present invention.

In view of the markedly longer treatment times and the lower surface power of the IR radiators in comparison to the state of the art, the method according to an embodiment of the invention for the thermal treatment of friction linings causes the entire friction lining to be heated up, rather than just its surface. This gives rise to a relatively flat temperature gradient throughout the thickness of the friction lining, whereby the highest temperature is on the friction lining surface while the lowest temperature is on the opposite side (facing away from the IR radiators), although the temperature there is preferably still at least 300° C. [572° F.]. In other words, the entire friction lining compound is heated to a relatively constant temperature, resulting in a uniform hardness profile throughout the thickness of the friction lining. Inhomogeneities of the products due to different temperatures during the thermal treatment on (parts of) the surface and in the interior of the friction lining are thus largely avoided. The reproducibility of a uniform product quality is markedly improved.

Additional advantages of the thermal treatment according to an embodiment of the invention are, for example, the following:

due to the lower surface power of the IR radiators, they can be positioned much closer to the friction linings that are to be treated, the energy (heat) is efficiently transmitted to the friction lining compound, thereby saving energy, and the quantity of undesired exhaust gases during the treatment is markedly reduced.

The present invention also comprises a method for the thermal treatment of friction linings in which the described thermal treatment over a prolonged treatment time at moderate temperatures is followed by a second, short treatment time as is described, for example, in the cited state of the art, in which the heating power of the IR radiators is briefly increased and, due to this intense heating, only the surface of the friction lining is heated to a high temperature. In this context, the first step constitutes a continuous hardening of the entire friction lining compound, while the second step constitutes a scorching of only the friction lining surface.

The invention claimed is:

1. A method for thermally treating friction linings, comprising:
    emitting IR radiation with wavelength(s) in the range of 2260 nm to 3000 nm from one or more IR radiation sources comprising one or more ceramic IR radiators or ceramic IR heating fields that generate IR radiation with a maximum radiation power in the wavelength range from 2260 nm to 3000 nm;
    directing the IR radiation onto a friction lining body for a duration of 300 seconds to 2400 seconds to heat the friction lining body, wherein the friction lining body has a top surface and a surface opposite the top surface and defines a thickness between the top surface and the opposite surface, and wherein the heating directs IR radiation from the one or more IR radiation sources onto the top surface of the friction lining body; and
    detecting a surface temperature of the friction lining body for controlling the one or more IR radiation sources to maintain a desired temperature of the friction lining body top surface and opposite surface, wherein following the heating for the duration of 300 to 2400 seconds the desired temperature of the top surface of the friction lining body is in the range from 300° C. to 500° C. (572° F. to 932° F.), and the desired temperature of the opposite surface of the friction lining body is at least 300° C. (572° F.).

2. The method according to claim 1, wherein the one or more IR radiation sources have a surface power of 10 kW/m$^2$ to 80 kW/m$^2$.

3. The method according to claim 1, wherein the one or more IR radiation sources have a surface power of 20 kW/m$^2$ to 40 kW/m$^2$.

4. The method according to claim 1, wherein the one or more IR radiation sources is an IR radiator comprising an electric resistance heat conductor that is mounted onto a ceramic substrate.

5. The method according to claim 1, wherein the one or more IR radiation sources is a IR radiation source that comprises IR heating fields that are gas-heated ceramic pore radiators.

6. The method according to claim 1, wherein after the heating, the friction lining body has a uniform hardness profile throughout its thickness.

* * * * *